(12) United States Patent
Gopalakrishna et al.

(10) Patent No.: US 8,086,960 B1
(45) Date of Patent: Dec. 27, 2011

(54) INLINE REVIEW TRACKING IN DOCUMENTS

(75) Inventors: Ramesha Gopalakrishna, Bangalore (IN); Anand S. Edwin, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 984 days.

(21) Appl. No.: 11/809,612

(22) Filed: May 31, 2007

(51) Int. Cl.
G06F 17/00 (2006.01)
(52) U.S. Cl. ......... 715/266; 715/234; 715/236; 715/751
(58) Field of Classification Search .......... 715/230–237, 715/266, 762, 764
See application file for complete search history.

(56) References Cited

U.S. PATENT DOCUMENTS

| 5,666,490 | A | 9/1997 | Gillins et al. |
| 7,107,518 | B2 | 9/2006 | Ramaley et al. |
| 7,263,655 | B1 * | 8/2007 | Carden, Jr. .................... 715/234 |
| 7,302,674 | B1 | 11/2007 | Gladieux et al. |
| 7,418,656 | B1 * | 8/2008 | Petersen ....................... 715/230 |
| 2002/0091725 | A1 | 7/2002 | Skok |
| 2004/0205653 | A1 * | 10/2004 | Hadfield et al. ............. 715/530 |
| 2006/0259854 | A1 | 11/2006 | Walker |
| 2006/0282762 | A1 | 12/2006 | Diamond et al. |
| 2007/0096907 | A1 | 5/2007 | Jam et al. |
| 2008/0270406 | A1 * | 10/2008 | Flavin et al. ..................... 707/8 |
| 2009/0031401 | A1 * | 1/2009 | Cudich et al. .................... 726/4 |

OTHER PUBLICATIONS

David J Taylor "Annotation of web resources" published May 2006 by BSc (hons) in Computer Science ACM digital library pp. 1-170.*

* cited by examiner

*Primary Examiner* — Quoc A Tran
(74) *Attorney, Agent, or Firm* — Robert C. Kowert; Meyertons, Hood, Kivlin, Kowert & Goetzel, P.C.

(57) ABSTRACT

Inline review tracking in documents is described, including receiving an input to a document displayed in a browser, generating a comment and an option, the comment being configured to describe the input and the option being configured to perform one or more actions associated with the input, marking the document with a tag based on the input, storing the input using another tag in a comment section of the document; and presenting the document, the comment, and the option, wherein the document is displayed in a first frame, and the comment and the option are displayed in a second frame.

26 Claims, 12 Drawing Sheets

```
<html>
<title> The Naval Battle of Trafalgar </title>
```
332 → `<!-- replace "1" in "1815" with "0" -- insert <p> after "follow." -- >`
```
<body>         ~320    ~320
Fought in 18<input1>1</input1>5 off the coast of Spain, the
Battle of Trafalgar led to the supremacy of Britain's maritime
power and shaped the European continent and world politics for
```
334 → ~~decades to follow~~.`<p></p>`Exhibiting initiative and leadership,
Lord Horatio Nelson, Admiral of the Fleet and Britain's Royal
Navy, led from his flagship, HMS VICTORY, directing his line of
battle ships into the French and Spanish lines.  Signaling that
"England expects every man to do his duty," his ships of the line
engaged and divided the French and Spanish ships.  At close
range, carronades and broadsides rang out as British 'tars'
demonstrated their well trained ability to maneuver and to
sustain a high rate of fire....
`</body>`

Reviewer Input

342 — Monday, May 14, 2007 by Reviewer 1
     Change "1" to "0"

344 — Wednesday, May 16, 2007 by Reviewer 5
     Insert paragraph break after "....follow."

INLINE REVIEW TRACKING IN DOCUMENTS

FIELD OF THE INVENTION

The present invention relates generally to computer programs and software applications, and document editing and authoring. More specifically, inline review tracking in documents is described.

BACKGROUND OF THE INVENTION

In conventional solutions, editing documents formatted using markup languages such as hypertext markup language (HTML), extensible markup language (XML), or other markup languages may be performed using tags or object-oriented or other types of applications that allow a user to invoke actions to specify, identify, or otherwise indicate where and how a document should be modified. However, conventional solutions are often problematic.

In some conventional solutions, document editing may be difficult because a user is unable to edit a web page, for example, using a web browser. Conventional web browsing applications are not configured to allow editing of content (e.g., text, images, graphics, or other elements of a web page or document presented using HTML or another markup language). Other conventional solutions involve the use of an application configured to review and edit content formatted in HTML or other markup languages. However, some conventional solutions are also problematic because a user reviewing a document must use separate applications to view the content to be edited and another application to provide edits to the content. Further, conventional solutions are also problematic because users (e.g., reviewers, authors) must add comments and edits in a different on-screen area than where the document appears, thus preventing a view of a document incorporating the indicated changes (i.e., showing the document as it will appear when rendered with the edit in a web browser). Further, a document author must view the edits and comments in a separate area and identify a location associated with the edits in order to determine whether to incorporate the edits. This may be confusing and time-consuming to a user attempting to subjectively review the edits and decide whether to incorporate any indicated changes. In other words, conventional solutions do not provide context to edits submitted by a reviewer to a user. Additionally, if a reviewer directly incorporates an edit or change to content, this may not be visible to the document author, which can create problems when certain types of edit-sensitive documents (e.g., legal or financial documents) are involved. Still further, if multiple reviewers provide edits to a document, then an author must review changes submitted from each reviewer to determine how to reconcile conflicting edits to the same portion or area of a document, whether to incorporate the edits or discard some, all of which are activities that can be time-consuming, confusing, and labor-intensive.

Thus, a solution for editing documents without the limitations of conventional techniques is needed.

BRIEF DESCRIPTION OF THE DRAWINGS

Various examples are disclosed in the following detailed description and the accompanying drawings:

FIG. 3C illustrates an exemplary data structure for use with in-line review tracking;

FIG. 3D illustrates exemplary edits generated using an exemplary in-line review tracking system;

DETAILED DESCRIPTION

Figure 1:
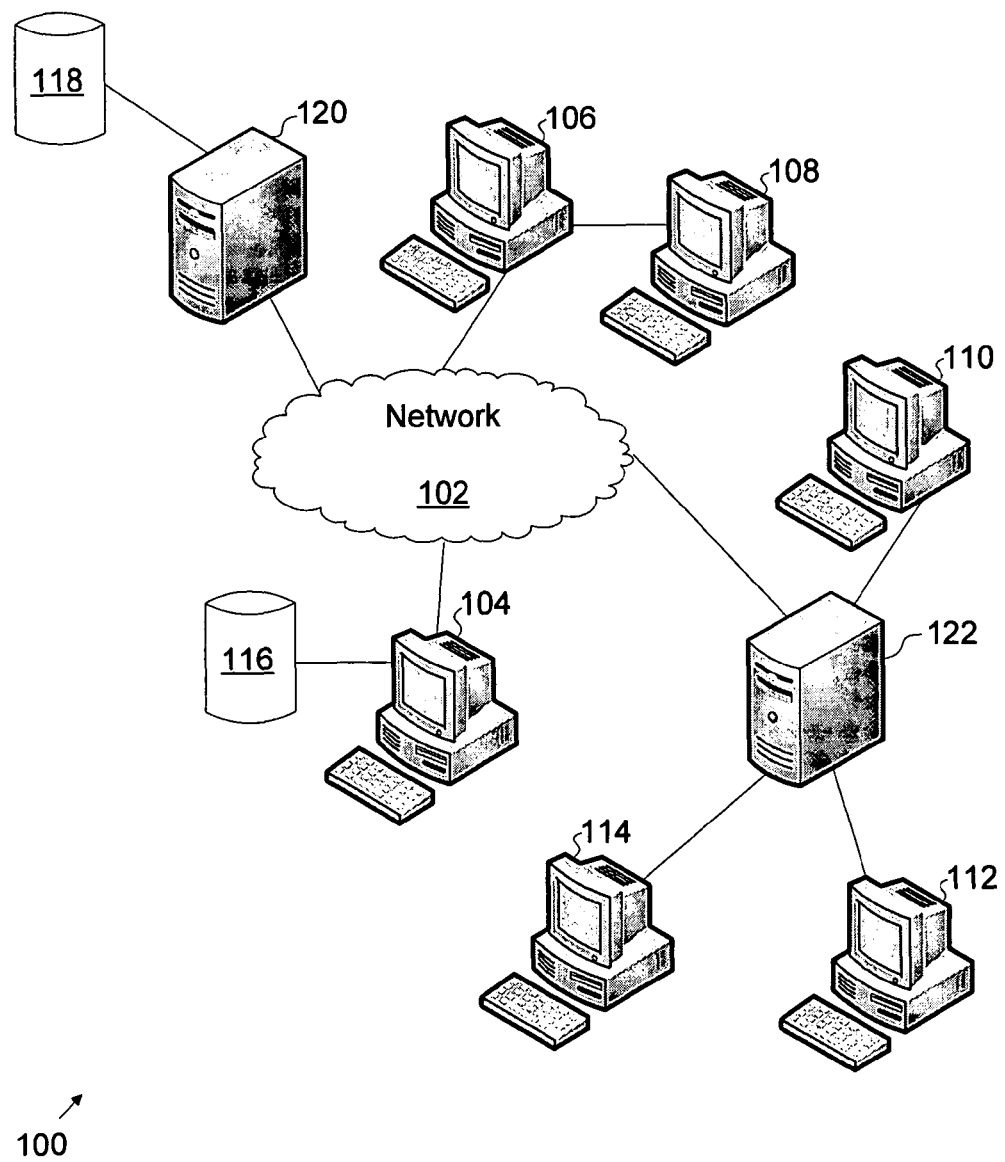
FIG. 1 illustrates an exemplary in-line review tracking system.

Various embodiments or examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the embodiments has not been described in detail to avoid unnecessarily obscuring the description.

In some examples, the described techniques may be implemented as a computer program or application ("application") or as a module or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, Flex™, Java™, Javascript™, Ajax, COBOL, Fortran, ADA, XML, HTML, DHTML, XHTML, HTTP, XMPP, and others. Design, publishing, and other types of applications such as Dreamweaver®, Shockwave®, Flash®, and Fireworks® may also be used to implement the described techniques. The described techniques may be varied and are not limited to the examples or descriptions provided.

In-line review tracking in documents is described, which may include allowing one or more users to provide in-line edits to a document (e.g., any discrete set of data that may be presented in an application such as a web browser, HTML editing application, or the like) while allowing a document author ("author") to view the original document and determine whether to accept, reject, modify, or otherwise manipulate edits provided by reviewers. In-line review tracking techniques such as those described below also permit users (e.g., reviewers, authors, and others) to view edits incorporated into a document being viewed using, for example, an HTML editing, web browsing, blog editing, or other type of document viewing and editing application. Further, reviewers may send their edits and comments to a document author, who may view the original document apart from any edits, allowing the document author to determine whether to incorporate (i.e., accept), reject, or otherwise modify the edits. The described techniques may be varied and are not limited to the examples provided.

FIG. 1 illustrates an exemplary in-line review tracking system. Here, system 100 includes network 102, clients 104-114, repositories 116-118, and servers 120-122. In other examples, the type, number (i.e., quantity), configuration, topology, and configuration of the described elements (i.e., network 102, clients 104-114, repositories 116-118, and servers 120-122) in system 100 may be varied and are not limited to the examples shown. For example, network 102 may be implemented using any type of public (e.g., Internet, World Wide Web, public wireless network, and others) or private (e.g., corporate local area network (LAN), wide area network (WAN), municipal area network (MAN), wireless local area network (WLAN), and the like) data network. As another example, clients 104-114 may be implemented using various types of processing devices such as desktop, notebook, or laptop computers. Clients 104-114 may be implemented using various types of topologies. For example, client 104 may be coupled directly or indirectly to network 102, which may be configured to allow data transfer with other clients (e.g., clients 106-114) coupled to network 102. Here, clients 110-114 may also be coupled directly or indirectly to server 122, which may be include one or more processors configured to execute software, computer programs, or other applications (e.g., applications). Further, applications configured to provide some, none, or all of in-line reviewing tracking processes such as those described below may also be installed on one or more of clients 104-114 or servers 120-122. Further, data used to execute in-line reviewing tracking processes may be stored, retrieved, deleted, modified, supplemented, or otherwise accessed using repositories 116-118. System 100 provides an illustrative example of data network configurations, types, and topologies that may be used to implement the described techniques. In other examples, the above-described elements may be varied in design, function, configuration, quantity, and other aspects, and are not limited to the descriptions provided.

Figure 2A:
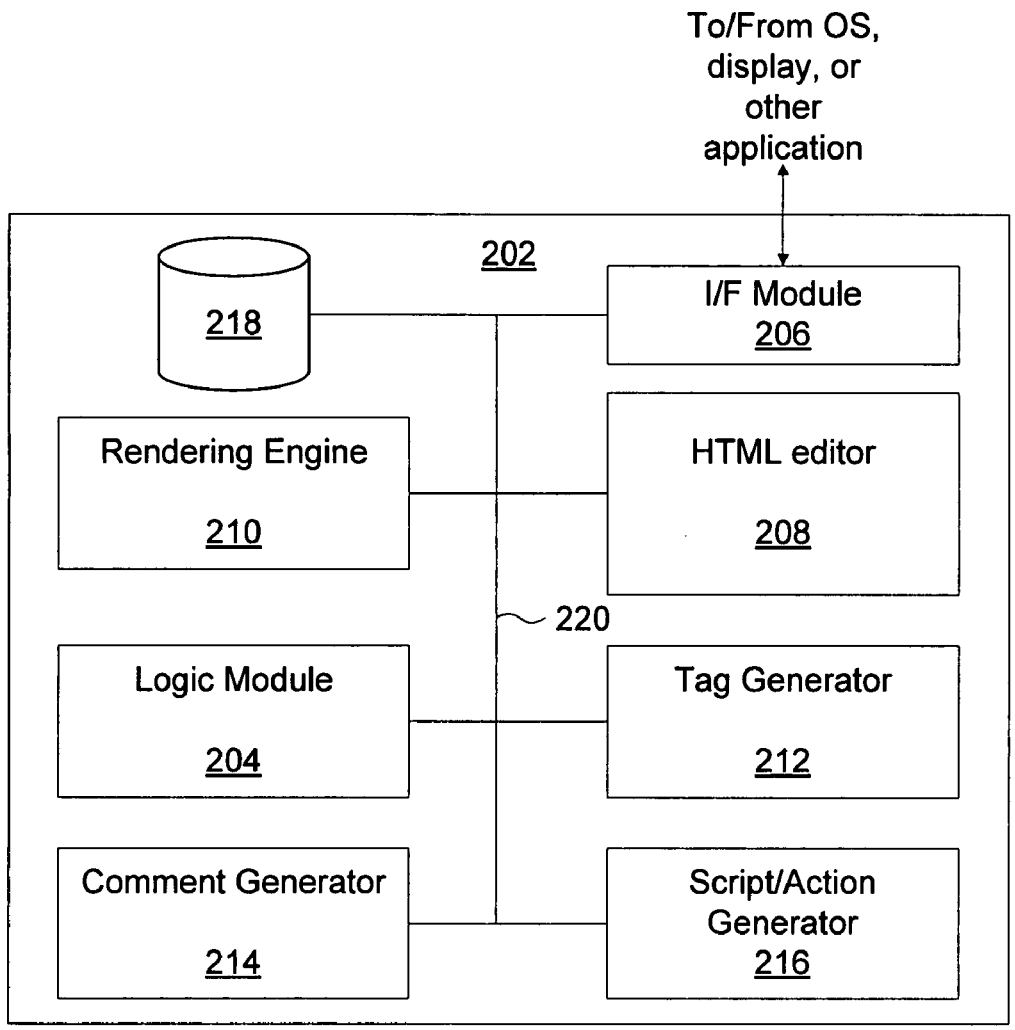
FIG. 2A illustrates an exemplary in-line reviewing tracking application.

FIG. 2A illustrates an exemplary in-line reviewing tracking application. Here, application 202 includes logic module 204, interface (I/F) module 206, HTML editor 208, rendering engine 210, tag generator 212, comment generator 214, script/action generator 216, repository 218, and bus 220. In some examples, logic module 204, interface (I/F) module 206, HTML editor 208, rendering engine 210, tag generator 212, comment generator 214, script/action generator 216, and repository 218 may be in data communication using bus 220, which may be a logical or physical coupling to allow data transfer between processes such as those described. Further, I/F module 206 may be in data communication with one or more external processes (not shown) using actual or physical ports (not shown), processes, or other data interfaces. Other external processes may include, but are not limited to operating systems, applications, state machines, virtual state machines, and others.

In some examples, when data is received by I/F module 206, it may be transferred to one or more other modules (e.g., logic module 204, interface (I/F) module 206, HTML editor 208, rendering engine 210, tag generator 212, comment generator 214, script/action generator 216, repository 218, and others) using bus 220. For example, data encapsulated in packets, segments, frames, and others may be used to render a document (e.g., web page, article, text-based document, or other discrete item created by a user (i.e., author)) using rendering engine 210. An on-screen display may be generated using rendering engine 210, which may be configured to interpret formatting commands, tags, and other elements embedded or otherwise included with a document that determine how to display the document on a user interface ("interface") such as those described below in connection with FIGS. 3A-3B and 4A-4B.

Referring back to FIG. 2A, a document rendered by application 202 may be configured to receive in-line edits using HTML editor 208, tag generator 212, comment generator 214, and script/action generator 216. Further, logic module 204 may be configured to direct one or more of logic module 204, interface (I/F) module 206, HTML editor 208, rendering engine 210, tag generator 212, comment generator 214, script/action generator 216, repository 218, and bus 220 in order to display (i.e., present) a document in a window or display provided using a web browsing, web editing, HTML editing, document authoring, document editing, or other type of editing application. Further, logic module 204 may be configured to control how a reviewer provides edits to a document and how the entered edits are presented in an interface to an author.

Here, tag generator 212 may be configured to generate (i.e., provide) markup tags such as HTML tags that identify edits ("inputs") placed in a document by a reviewer. For example, a tag may be generated to identify where a character in a document may be inserted or deleted. As another example, a tag may be generated to identify where a given formatting edit, such as a paragraph break, starts and ends. As a further example, another type of tag may be used to identify where a given user's edits start and where they end. In other examples, comment generator 214 may be used to allow the input of comments by a user, providing formatting and other parameters that may be used to determine how and where comments are added in a document. In other words, comment generator may be used to provide comments from a reviewer to an author using various techniques. Still further, script/action generator 216 may be configured to generate actions that may be associated with a reviewer or author's edits and incorporated into a document. For example, if a reviewer enters an edit to a document, script/action generator 216 may be configured to provide a "button" or other on-screen element (i.e., "widget") that allows a document author to accept, reject, or modify the reviewer's edits. In other examples, application 202 and the above-described elements may be varied in design, function, configuration, or implementation and are not limited to the descriptions provided above.

Figure 2B:
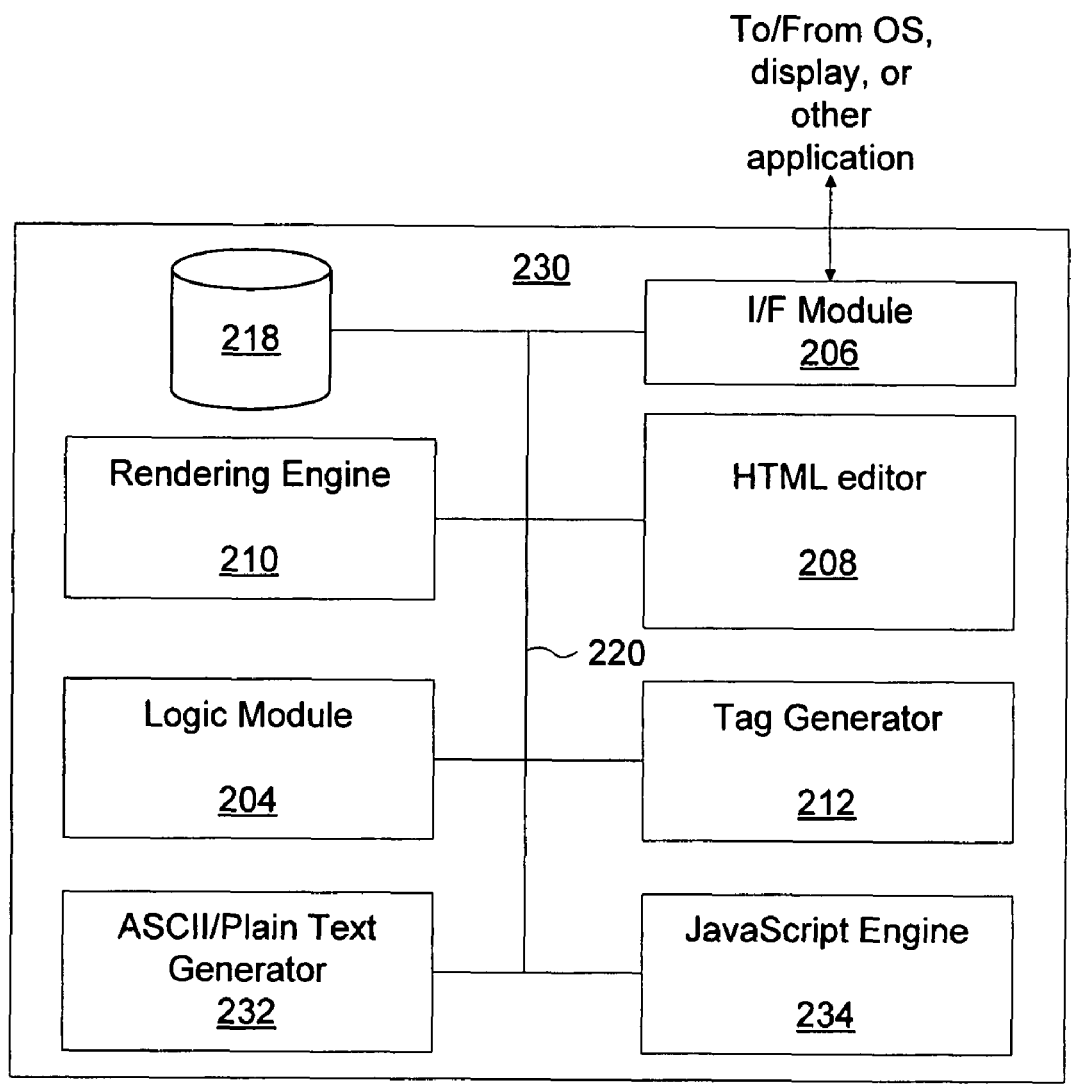
FIG. 2B illustrates an alternative exemplary in-line reviewing tracking application.

FIG. 2B illustrates an alternative exemplary in-line reviewing tracking application. Here, application 230 includes logic module 204, interface (I/F) module 206, HTML editor 208, rendering engine 210, tag generator 212, repository 218, and bus 220. In some examples, application 230 includes logic module 204, interface (I/F) module 206, HTML editor 208, rendering engine 210, tag generator 212, repository 218, and bus 220 may be implemented substantially similar to the above-described elements provided above in connection with FIG. 2A. In other examples, application 230 includes logic module 204, interface (I/F) module 206, HTML editor 208, rendering engine 210, tag generator 212, repository 218, and bus 220 may be implemented differently and are not limited to the examples provided above.

Here, ASCII/plain text generator 232 is an example of a module that may be used to provide edits or comments in plain text, American Standard Code for Information Interchange (ASCII), or other formats. Further, JavaScript engine 234 may be used to generate on-screen interactive actions, buttons, elements, icons, or other interface elements to a user (e.g., reviewer, author, and others). In some examples, in-line review tracking may be implemented by logic module 204, which directs comments and edits to be input and displayed using plain text, ASCII, or other formats that may be generated with reduced processor and memory storage requirements. Further, when presenting edits to a user, JavaScript engine 234 may be used to generate actions associated with edits formatted using plain text, ASCII, or others. In other examples, different types and formats of comments and edits may be used and are not limited to those shown and described. Likewise, other types of scripting languages and engines other than JavaScript engine 234 may be used and are not limited to the examples shown. Still further, application 230 and the above-described elements may be varied in number, type, function, implementation, and configuration and are not limited to the examples provided.

Figure 3A:
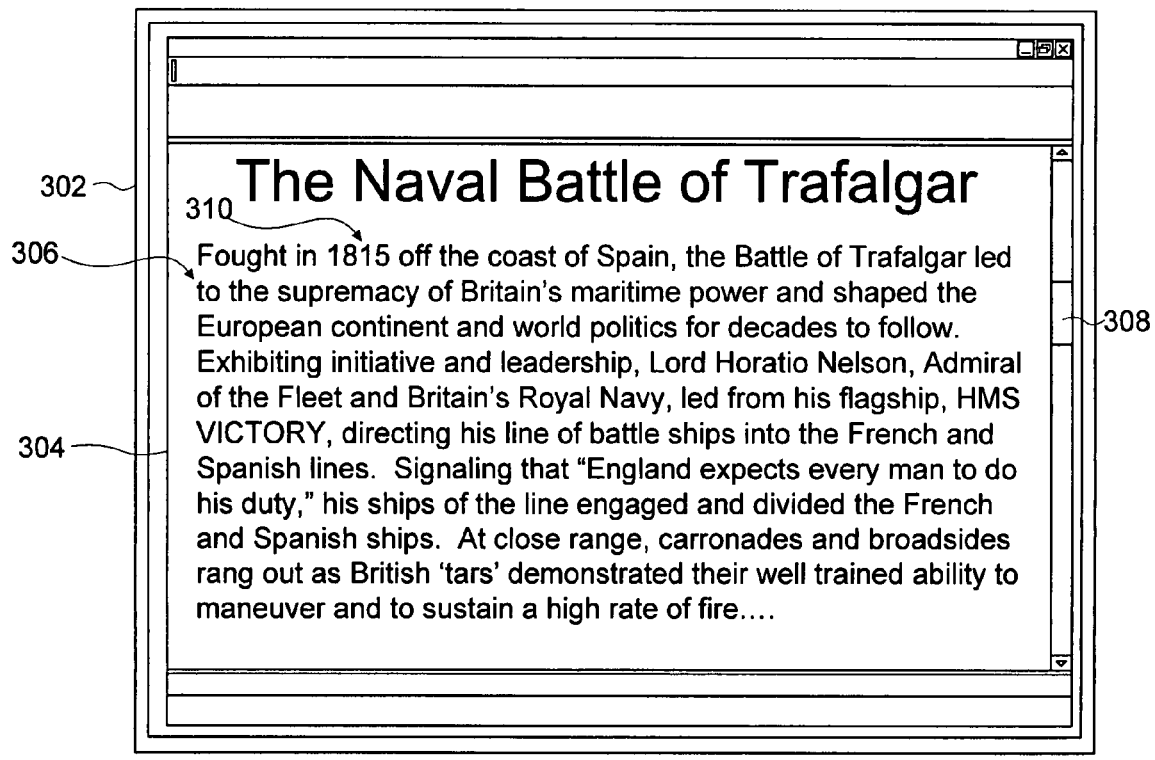
FIG. 3A illustrates a document edited using an exemplary in-line review tracking system.

FIG. 3A illustrates a document edited using an exemplary in-line review tracking system. Here, interface 302 includes display 304, document 306, scroll bar 308, and character 310. In some examples, interface 302 and display 304 may be a screen, window, panel, or display ("display") presented on a computer monitor or terminal associated with clients 104-114 (FIG. 1) or servers 120-122 (FIG. 1). Further, display 304 may be a document presented using an in-line review tracking application (e.g., 202 (FIG. 2A), 230 (FIG. 2B)). Here, document 304 is a text-based article presented in display 304, which may be an editing or reviewing screen implemented using application 202 (FIG. 2A) or 230 (FIG. 2B). If text, images, graphics, characters, numbers, or other on-screen items do not appear, scroll bar 308 may be manipulated (i.e., moved up or down using an input/output device such as a computer mouse) to move (i.e., scroll) the article up or down. Here, character 310 is provided as an example of an item that may be reviewed and edited using the techniques described herein. In other examples, different reviewing or editing techniques may be implemented and are not limited to those shown.

Figure 3B:
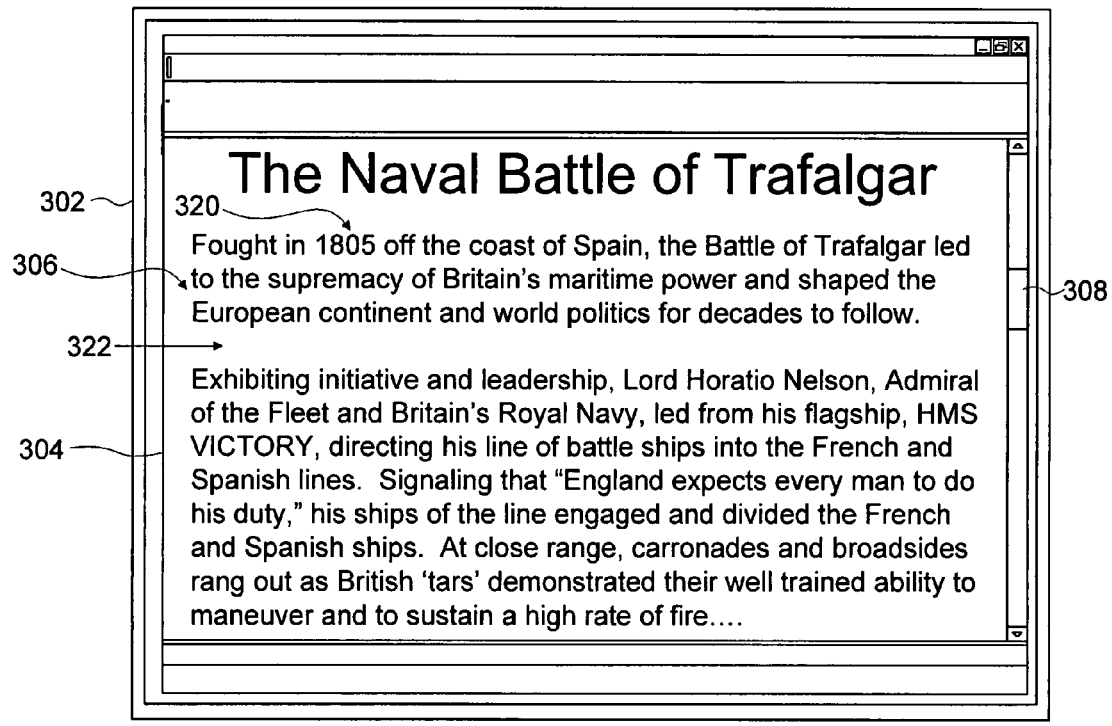
FIG. 3B illustrates a document reviewed using an exemplary in-line review tracking system.

FIG. 3B illustrates a document reviewed using an exemplary in-line review tracking system. Here, interface 302 includes display 304, document 306, scroll bar 308, character 320, and paragraph break 322. Display 304 may be an on-screen presentation of information or data associated with a document. When presented in display 304, a document may be configured to permit a user (e.g., reviewer) to submit inline reviews that may be tracked using, for example, application 202 (FIG. 2A), 230 (FIG. 2B), or others. In some examples, a reviewer may modify a character (e.g., character 310) and replace it with character 320. Further, a reviewer may also insert paragraph break 322, as shown and described. In other examples, different edits may be provided by a reviewer using techniques such as those described above.

FIG. 3C illustrates an exemplary data structure for use with in-line review tracking. Here, an exemplary data structure 330 includes comment section 332 and formatting tags 334. In some examples, when edits associated with a document are provided, tags may be inserted that identify where the edits are to be placed. For example, paragraph break 334 may be inserted into the text of an article (e.g., document 306 (FIGS. 3A-3B)), but stored in a comments section of an HTML-formatted document. In other words, edits intended for insertion in the body of an HTML-formatted document may be identified using various types of tags and stored in a comments section of the document. When read (i.e., parsed, interpreted, rendered, displayed), inline edits are extracted from comment section 332 and applied to the body of a document. Thus, edits may be preserved as part of a document, but allow a reviewer to view the document as edited inline or an author to view the edits apart from the original document. In other examples, different types of formatting languages and sections may be used and are not limited to the examples provided.

FIG. 3D illustrates exemplary edits generated using an exemplary in-line review tracking system. Here, reviewer input 340 includes edits 342-344, which may be input using techniques similar to a "wiki" or web-based application that allows open addition or editing of content. In some examples, when multiple users (e.g., reviewers) are editing a document, edits may be collectively presented to, for example, an author and presented in a format substantially similar to reviewer input 340. In other examples, reviewer input 340 may be presented differently and is not limited to the design, layout, or functions shown.

Figure 4A:
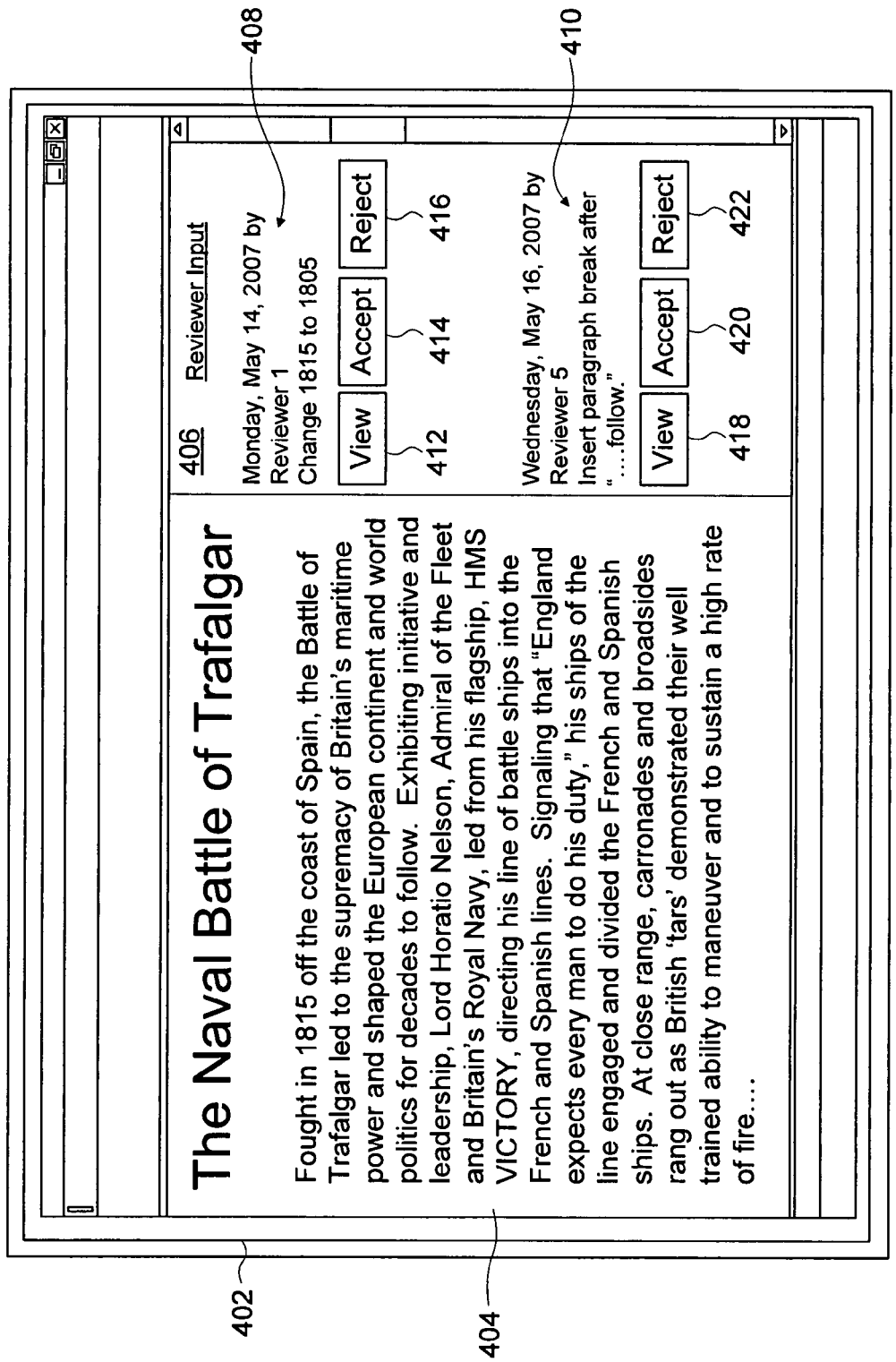
FIG. 4A illustrates an exemplary in-line review tracking display.

FIG. 4A illustrates an exemplary in-line review tracking display. Here, interface 402 includes document 404, edit display 406, edits 408-410, and buttons 412-422. In some examples, when document 404 is presented on interface 402 to a document author, a separate display (e.g., edit display 406) may be presented, thus allowing an author to view the original document without incorporated edits from one or more users. Here, two reviewers (i.e., Reviewer 1, Reviewer 5) have provided edits to document 404. In some examples, when reviewers provide edits, document 404 may be configured to permit inline editing (i.e., document 404 is modified when edits 408-410 are input by reviewers). Here, when an author receives edits back from one or more reviewers (e.g., Reviewer 1, Reviewer 5), she may perform several functions. For example, an author may select button 412 to view document 404 with edit 408 incorporated (i.e., "1815" is changed to "1805"). As another example, an author may select button 420 and edit 410 provides a paragraph at the location indicated by Reviewer 5. As yet another example, an author may select button 416 or button 422 and reject edits 408 or 410. In still other examples, different actions may be provided by, for example, script/action generator 216 (FIG. 2A), JavaScript engine 234 (FIG. 2B), or another module or process apart from those shown and described. In still other examples, interface 402 and the above-described elements may be varied in function, design, layout, or implementation and are not limited to the descriptions provided.

Figure 4B:
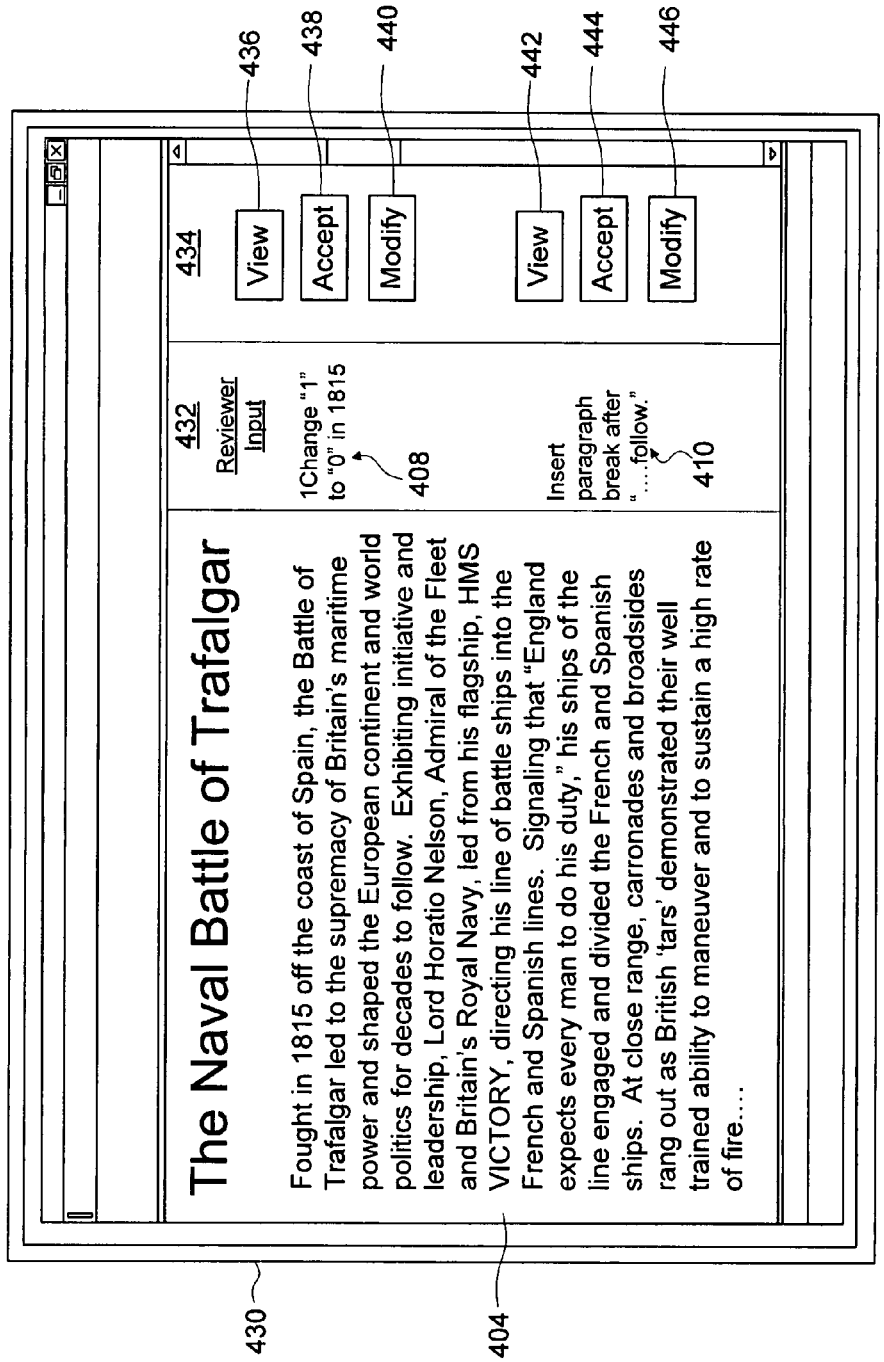
FIG. 4B illustrates an alternative exemplary in-line review tracking display.

FIG. 4B illustrates an alternative exemplary in-line review tracking display. Here, interface 430 includes document 404, edits 408-410, panels 432-434, and buttons 436-446. In some examples, the above-described techniques may be implemented by inserting or generating columns or tables within an HTML-formatted document for presenting information or data (e.g., edits 408-410) in panels 432-434. An HTML document (e.g., document 404) may be a data structure that includes tables, columns, or rows that may be added, inserted, or deleted to accommodate information or data that is populated in document 404 when rendered on-screen (i.e., on interface 430). In other examples, data structures other than tables may be used and are not limited to those shown and described.

Here, an alternative of interface 402 is shown using interface 430. When presented to an author of document 404, reviewer inputs may be provided in panel 432 and actions may be presented in panel 434. Document 404 may be presented to other users in addition an author of document 404. When presented, an author may review edits provided by one or more reviewers and take one or more actions (e.g., "View," "Accept," "Modify," or others) by selecting one or more of buttons 436-446. In some examples, when an action is selected, document 404 may be presented with the edits accepted or rejected. In other examples, edits may also be modified by an author if buttons 440 or 446 are selected. In still other examples, other actions beyond those provided by buttons 436-446 may be presented in panel 434 and are not limited to those shown. Further, edits 408-410 and buttons 436-446 may be varied in number, design, layout, function, or implementation and are not limited to the examples shown and described.

Figure 5A:
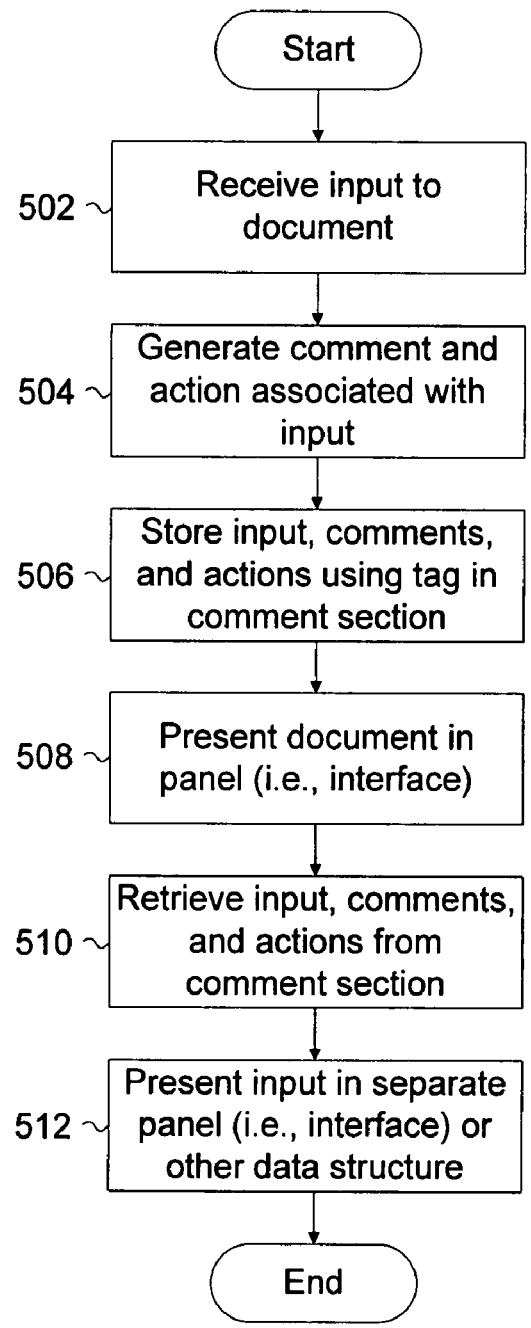
FIG. 5A illustrates an exemplary in-line review tracking process.

FIG. 5A illustrates an exemplary in-line review tracking process. Here, an input is received to a document (e.g., document 404 (FIGS. 4A-4B)) (502). In some examples, an input may be an edit, deletion, insertion, or other action taken by a reviewer, author, or other user. The received input is stored as a comment and an action, generating, in some examples, a plain text or ASCII-based comment and a JavaScript action, respectively (504). In other examples, comments and actions associated with an input (e.g., edit) may be handled differently. Here, the input and any associated comments or actions (e.g., view, accept, delete, insert, replace, and others) are stored using a tag, which may be any type of HTML, XML, or other type of formatting or markup language tag that is used to identify an edit to a document in a comment section of a document (e.g., 506). After storing the input and any associated comments or actions the document is presented in an interface (508). When presented, the input is parsed, interpreted, and read from the comment section of the document (510). Once read, the input may be generated, incorporated within a document, and presented in a panel or other interface element or data structure (e.g., table) of a document presented or displayed (512). Alternatively, input may be presented apart from a document to permit the original text, images, or other material to be presented to an author. In other examples, the above-described process may be varied in function, order, and implementation and is not limited to the description provided.

Figure 5B:
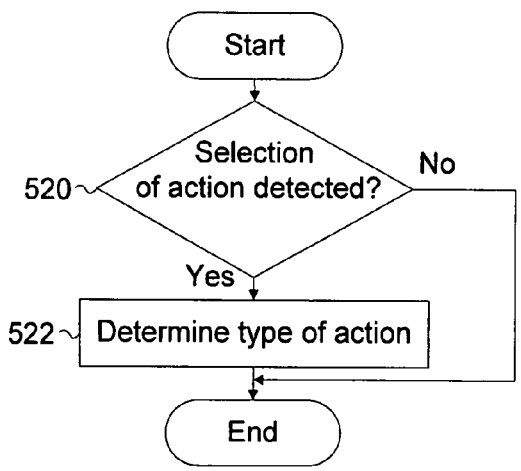
FIG. 5B illustrates an exemplary in-line review tracking sub-process.

FIG. 5B illustrates an exemplary in-line review tracking sub-process. Here, after comments and actions (i.e., input, edit) have been presented (512), a determination is made as to whether an action has been selected (520). If no action has been detected, then the process ends. If the selection of an action has been detected, then the type of action is determined (522). In other examples, the above-described process may be varied in function, order, and implementation and is not limited to the description provided.

Figure 5C:
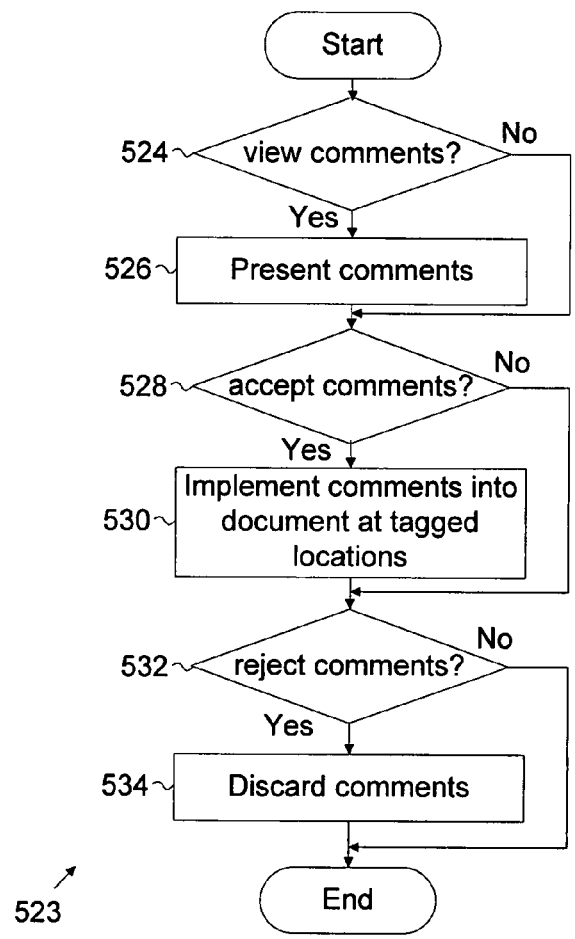
FIG. 5C illustrates an exemplary in-line review tracking sub-process.

FIG. 5C illustrates an exemplary in-line review tracking sub-process. Here, process 523 may be used to determine the type of action (522; FIG. 5B) selected for a given input. In some examples, a determination is made as to whether to view the input (524). If a determination is made to view the input, then the input is presented (i.e., in an interface provided by application 202 (FIG. 2A), application 230 (FIG. 2B), or the like) (526). If a determination is made to not view the input or after the input is presented (526), then another determination is made as to whether to accept the input (528). If accepted, the input is implemented (i.e., incorporated into the document) (530). If the input is not accepted or after accepting and implementing (i.e., incorporating) the input (530) into a document (e.g., document 404 (FIGS. 4A-4B)), another determination is made as to whether to reject the input (532). If the input is not rejected, then the process ends. Alternatively, if the input is rejected, then the input and any associated comments or actions generate earlier are discarded (534). In other examples, the above-described process may be varied in function, order, and implementation and is not limited to the description provided.

Figure 6:
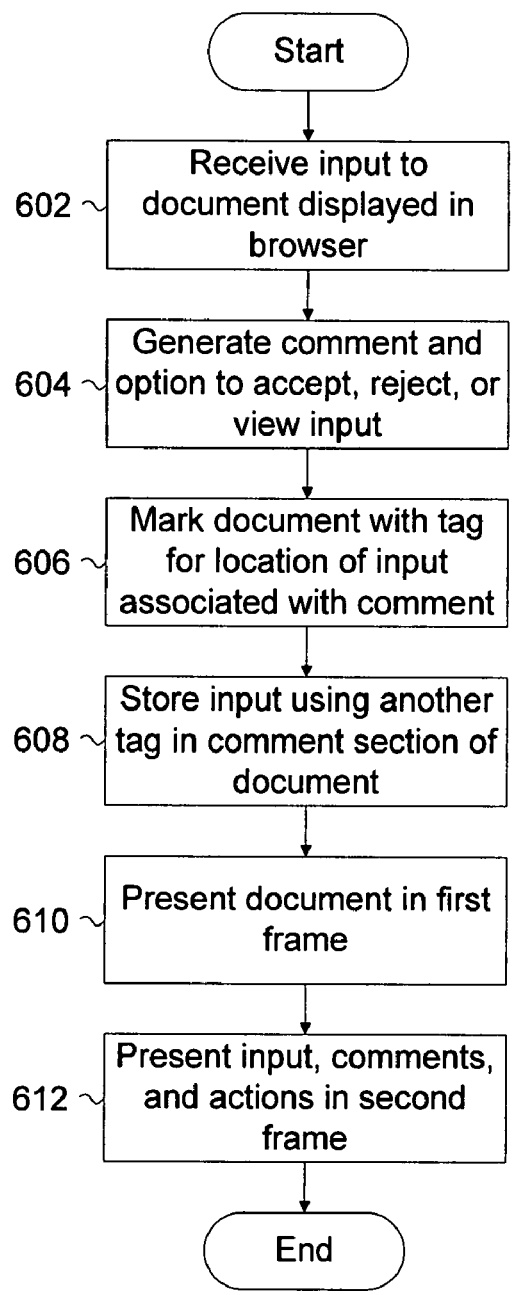
FIG. 6 illustrates an alternative exemplary in-line reviewing tracking process.

FIG. 6 illustrates an alternative exemplary in-line reviewing tracking process. Here, an input to a document displayed in a browser, for example, is received (602). A comment and an action (i.e., button) to accept, reject, or view the input is generated (604). In other examples, actions other than those described above may be generated and are not limited to those provided. A document is marked with one or more tags, such as those described above, to identify the location and manner in which the input associated with the input is to be implemented (606). Once implemented, the input may be stored in the comment section of an HTML document, for example, using another tag (608). Once stored, the document may be presented to an author, for example, in a first frame (i.e., panel) (610). The input and any comments or actions associated with the input may be generated and presented in another frame (i.e., panel) apart from the first frame (612). In other examples, the above-described process may be varied in function, order, and implementation and is not limited to the description provided.

Figure 7:
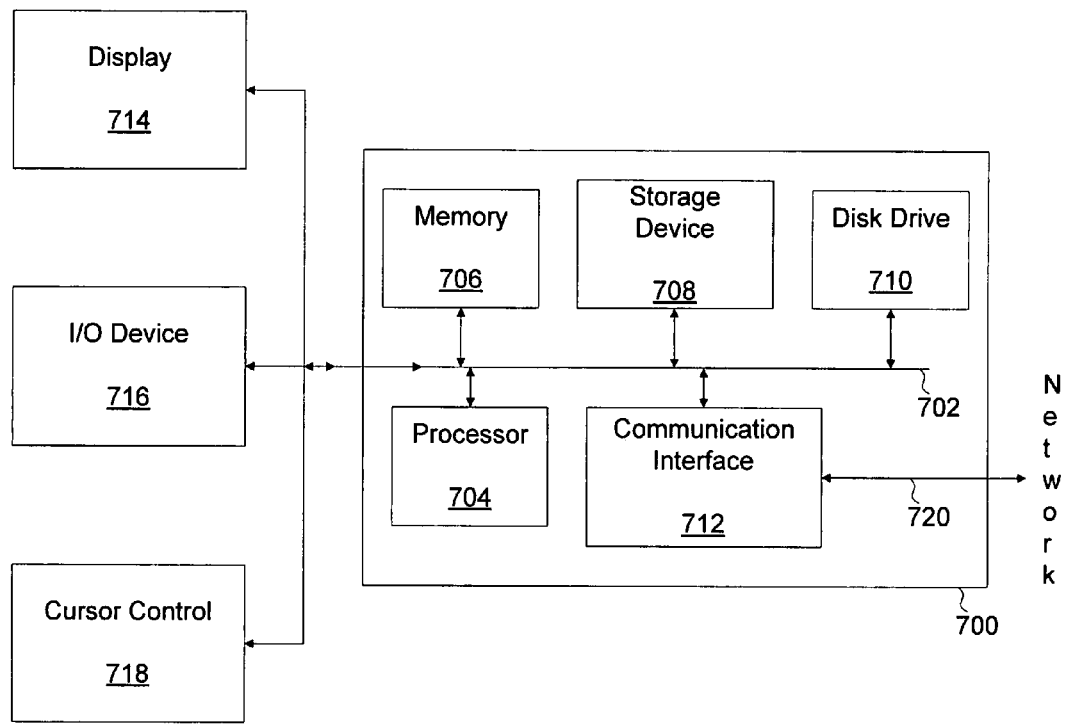
FIG. 7 illustrates an exemplary computer system suitable for in-line review tracking in documents.

FIG. 7 illustrates an exemplary computer system suitable for in-line review tracking in documents. In some examples, computer system 700 may be used to implement computer programs, applications, methods, processes, or other software to perform the above-described techniques. Computer system 700 includes a bus 702 or other communication mechanism for communicating information, which interconnects subsystems and devices, such as processor 704, system memory 706 (e.g., RAM), storage device 708 (e.g., ROM), disk drive 710 (e.g., magnetic or optical), communication interface 712 (e.g., modem or Ethernet card), display 714 (e.g., CRT or LCD), input device 716 (e.g., keyboard), and cursor control 718 (e.g., mouse or trackball).

According to some examples, computer system 700 performs specific operations by processor 704 executing one or more sequences of one or more instructions stored in system memory 706. Such instructions may be read into system memory 706 from another computer readable medium, such as static storage device 708 or disk drive 710. In some examples, hard-wired circuitry may be used in place of or in combination with software instructions for implementation.

The term "computer readable medium" refers to any medium that participates in providing instructions to processor 704 for execution. Such a medium may take many forms, including but not limited to, non-volatile media, volatile media, and transmission media. Non-volatile media includes, for example, optical or magnetic disks, such as disk drive 710. Volatile media includes dynamic memory, such as system memory 706. Transmission media includes coaxial cables, copper wire, and fiber optics, including wires that comprise bus 702. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 700. According to some examples, two or more computer systems 700 coupled by communication link 720 (e.g., LAN, PSTN, or wireless network) may perform the sequence of instructions in coordination with one another. Computer system 700 may transmit and receive messages, data, and instructions, including program, i.e., application code, through communication link 720 and communication interface 712. Received program code may be executed by processor 704 as it is received, and/or stored in disk drive 710, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed:

1. A method, comprising:
    receiving an input to a body of an electronic markup language document that is being displayed in a window; and
    in response to said receiving:
        generating a comment based on or including the input;
        storing the comment in a comment section of a data structure for the electronic document, wherein said storing comprises formatting the comment using a tag to identify the comment, wherein the comment section of the data structure is separate from a body section of the data structure, wherein the body section of the data structure includes content for the body of the electronic markup language document; and
        displaying the body of the electronic markup language document and an action user interface element in the window, wherein the action user interface element can be activated to perform an action in regard to at least part of the comment stored in the comment section of the data structure, wherein the action includes one or more of view, accept, reject, modify, delete, insert, or replace.

2. The method of claim 1, wherein the electronic document is formatted using HTML.

3. The method of claim 1, wherein the comment provides information about the input.

4. The method of claim 1, wherein the comment is generated using plain text.

5. The method of claim 1, wherein the action user interface element is generated using a scripting language.

6. The method of claim 1, wherein the action user interface element is generated using JavaScript.

7. The method of claim 1, wherein the input indicates a modification to the body of the electronic document.

8. The method of claim 1, wherein the tag indicates an edit to the electronic document, the tag being stored in a predefined format within the comment section of the electronic document.

9. The method of claim 1, wherein a portion of the body of the electronic document associated with the input is identified using another tag, the another tag being usable to determine how the electronic document is modified in accordance with the input.

10. A method, comprising:
    receiving an input to a body of an electronic markup language document that is being displayed in a browser; and
    in response to said receiving:
        generating a comment based on or including the input;
        marking a body section of a data structure for the electronic document with a tag based on the input, wherein the body section includes content for the body of the electronic markup language document;
        storing the comment in a comment section of the data structure for the electronic document, wherein said storing comprises storing the input using another tag to identify the comment, wherein the comment section of the data structure is separate from the body section of the data structure; and
        displaying the body of the electronic markup language document and an action user interface element, wherein the action user interface element is useable to cause the browser to parse the tag and the another tag to determine where the input can be applied to the electronic markup language document.

11. The method of claim 10, further comprising the browser parsing the tag and the another tag to determine how to modify the document using the input.

12. The method of claim 10, wherein the action user interface element is useable to perform an action to accept the modification made to the document in accordance with the input.

13. The method of claim 10, wherein the action user interface element is useable to perform an action to reject the modification made to the document in accordance with the input.

14. The method of claim 10, wherein the action user interface element is useable to perform an action to submit a request to view the input apart from the document.

15. The method of claim 10, wherein the action user interface element is useable to perform an action to submit a request to view the input and the comment apart from the document.

16. A system, comprising:
    a memory configured to store data associated with one or more electronic documents; and
    a processor configured to:
        receive an input to a body of an electronic markup language document that is being displayed in a window; and
        in response to receiving the input:
            generate a comment based on or including the input;
            store the comment in a comment section of a data structure for the electronic document, wherein said storing comprises storing the comment using a tag to identify the comment, wherein the comment section of the data structure is separate from a body section of the data structure, wherein the body section of the data structure includes content for the body of the electronic markup language document; and
            display the body of the electronic markup language document and an action user interface element in the window, wherein the action user interface element can be activated to perform an action in regard to at least part of the comment stored in the comment section of the data structure, wherein the action includes one or more of view, accept, reject, modify, delete, insert, or replace.

17. The system of claim 16, wherein the electronic document is formatted using HTML.

18. The system of claim 16, wherein the window is invoked using a browser.

19. A system, comprising:
a memory that stores instructions executable to implement a data structure, wherein the data structure is configured to store data associated with a document; and
a logic module configured to:
receive an input to a body of an electronic markup language document that is being displayed in a browser; and
in response to receiving the input:
generate a comment based on or including the input;
mark a body section of a data structure for the electronic document with a tag based on the input, wherein the body section includes content for the body of the electronic markup language document;
store the comment in a comment section of the data structure for the electronic document, wherein said storing comprises storing the input using another tag to identify the comment, wherein the comment section of the data structure is separate from the body section of the data structure; and
display the body of the electronic markup language document and an action user interface element, wherein the action user interface element is useable to cause the browser to parse the tag and the another tag to determine how the input can be applied to the electronic markup language document;
wherein the logic module is implemented, at least in part, by circuitry in the system.

20. The system of claim 19, wherein the comment describes a modification to the document.

21. The system of claim 19, wherein the action user interface element is useable to perform a request for an action associated with the comment.

22. The system of claim 21, wherein the action user interface element is useable to perform a request to view the comment.

23. The system of claim 21, wherein the action user interface element is useable to perform a request to reject a modification described in the comment.

24. The system of claim 21, wherein the action user interface element is useable to perform a request to accept a modification described in the comment as a modification to the document.

25. A non-transitory, computer readable storage medium storing instructions that when executed on one or more computers cause the one or more computers to perform:
receiving an input to a body of an electronic markup language document displayed in a browser; and
in response to said receiving:
generating a comment based on or including the input;
storing the comment in a comment section of a data structure for the electronic document, wherein said storing comprises storing the comment using a tag to identify the comment, wherein the comment section of the data structure is separate from a body section of the data structure, wherein the body section of the data structure includes content for the body of the electronic markup language document; and
displaying the body of the electronic markup language document and an action user interface element in the browser, wherein the action user interface element can be activated to perform an action in regard to at least part of the comment stored in the comment section of the data structure, wherein the action includes one or more of view, accept, reject, modify, delete, insert, or replace.

26. A non-transitory, computer readable storage medium storing instructions that when executed on one or more computers cause the one or more computers to perform:
receiving an input to a body of an electronic markup language document that is being displayed in a browser; and
in response to said receiving:
generating a comment based on or including the input;
marking a body section of a data structure for the electronic document with a tag based on the input, wherein the body section includes content for the body of the electronic markup language document;
storing the comment in a comment section of the data structure for the electronic document, wherein said storing comprises storing the input using another tag to identify the comment, wherein the comment section of the data structure is separate from the body section of the data structure; and
displaying the body of the electronic markup language document and an action user interface element, wherein the action user interface element is useable to cause the browser to parse the tag and the another tag to determine where the input can be applied to the electronic markup language document.

* * * * *